United States Patent
Selb et al.

(10) Patent No.: US 9,782,820 B2
(45) Date of Patent: Oct. 10, 2017

(54) PRODUCTION METHOD FOR A SEMI-FINISHED PRODUCT

(75) Inventors: Michael Selb, Feldkirch (AT); Matthias Wissling, St. Gallen (CH); Armin Kueper, Schellenberg (LI)

(73) Assignee: Hilti Aktiengesellschaft, Schaan (LI)

( * ) Notice: Subject to any disclaimer, the term of this patent is extended or adjusted under 35 U.S.C. 154(b) by 679 days.

(21) Appl. No.: 13/809,774

(22) PCT Filed: Jun. 8, 2011

(86) PCT No.: PCT/EP2011/059452
§ 371 (c)(1),
(2), (4) Date: Jan. 11, 2013

(87) PCT Pub. No.: WO2012/007231
PCT Pub. Date: Jan. 19, 2012

(65) Prior Publication Data
US 2013/0111964 A1     May 9, 2013

(30) Foreign Application Priority Data
Jul. 14, 2010   (DE) .................. 10 2010 031 316

(51) Int. Cl.
*B21H 3/02*          (2006.01)
*B21H 1/20*          (2006.01)
(Continued)

(52) U.S. Cl.
CPC ............ *B21H 3/02* (2013.01); *B21B 47/00* (2013.01); *B21H 1/20* (2013.01); *B21H 1/22* (2013.01);
(Continued)

(58) Field of Classification Search
CPC .. B21B 1/16; B21B 1/163; B21B 1/18; B21B 1/1033; B21H 3/02; B21H 1/20; B21H 1/22; B21H 3/022
(Continued)

(56) References Cited

U.S. PATENT DOCUMENTS 996,840 A      7/1911   Deeds
1,560,749 A    11/1925  Whiterow
(Continued)

FOREIGN PATENT DOCUMENTS

CN      2030513      1/1989
CN      1038041      12/1989
(Continued)

*Primary Examiner* — Teresa M Ekiert
(74) *Attorney, Agent, or Firm* — Davidson, Davidson & Kappel, LLC

(57) ABSTRACT

A production method for an elongated semi-finished product. A continuously fed wire is rolled by a rotating roller. Along its circumference, the roller has a first segment with a roller profile that rolls a profile into first sections of the wire, and also has a second segment without a roller profile that is rotated contact-free relative to the wire. During the rolling of the profile, the speed of the roller is adjusted in such a way that the speed of the roller profile is the same as the speed of the wire. During the contact-free rotation, the speed of the roller is adjusted in such a way that a length of the wire corresponding to a prescribed length of the second section passes the roller contact-free. A semi-finished product having the first section and having the second section is cut off of the shaped wire.

20 Claims, 3 Drawing Sheets

(51) Int. Cl.
   *B21H 1/22*   (2006.01)
   *B21B 47/00*  (2006.01)
   *B21B 1/16*   (2006.01)
   *B21B 1/18*   (2006.01)
   *F16B 35/00*  (2006.01)

(52) U.S. Cl.
   CPC ............ *B21H 3/022* (2013.01); *F16B 35/00* (2013.01); *B21B 1/16* (2013.01); *B21B 1/18* (2013.01)

(58) Field of Classification Search
   USPC .......... 72/10.3, 234, 190–199, 39, 203, 187, 72/370.21; 700/151
   See application file for complete search history.

(56) References Cited

U.S. PATENT DOCUMENTS

| | | | |
|---|---|---|---|
| 1,570,660 A | 1/1926 | Whiterow | |
| 1,998,970 A | 4/1935 | Sloan | |
| 3,137,185 A | 6/1964 | Glicken | |
| 3,170,343 A * | 2/1965 | Gauriat | 72/190 |
| 3,592,727 A * | 7/1971 | Weaver et al. | 428/399 |
| 3,722,249 A | 3/1973 | Zhukevich-Stosha et al. | |
| 4,955,219 A * | 9/1990 | Josef et al. | 72/187 |
| 5,797,710 A * | 8/1998 | Sawabe et al. | 408/222 |
| 6,877,351 B2 * | 4/2005 | Kashiwagi et al. | 72/366.2 |
| 7,374,494 B2 * | 5/2008 | Brewer et al. | 470/12 |
| 2002/0123417 A1 * | 9/2002 | Cote | 493/34 |
| 2010/0048309 A1 | 2/2010 | Gensert | |
| 2010/0218576 A1 * | 9/2010 | Felkl | 72/6.2 |

FOREIGN PATENT DOCUMENTS

| | | |
|---|---|---|
| CN | 2285173 | 7/1998 |
| CN | 2513696 | 10/2002 |
| DE | 4232115 | 3/1994 |
| DE | 10025060 | 1/2001 |
| DE | 102004016193 | 10/2005 |
| EP | 0754511 | 1/1997 |
| EP | 2156909 | 2/2010 |
| GB | 2 321 607 | 8/1998 |
| JP | 62244543 | 10/1987 |
| JP | 2010075963 | 4/2010 |

* cited by examiner

PRODUCTION METHOD FOR A SEMI-FINISHED PRODUCT

The present invention relates to a production method for a semi-finished product, especially an elongated semi-finished product having at least two differently profiled sections, for example, an anchor bolt.

SUMMARY OF THE INVENTION

It is an object of the present invention to provide a production method for an elongated semi-finished product having at least two differently profiled sections of prescribed lengths uses the following steps. A continuously fed wire is rolled lengthwise by means of a rotating roller. In lengthwise rolling, the roller is rotated around an axis that is perpendicular to the transport direction of the wire. Along its circumference, the roller has a first segment with a roller profile that rolls a profile into first sections of the wire, and also has a second segment without a roller profile that is rotated contact-free relative to the wire. Certain parts of the wire are alternately structured and certain parts are not structured. During the rolling of the profile, the speed of the roller is adjusted in such a way that the speed of the roller profile is the same as the feeding speed of the wire. Small deviations in the speeds can arise due to unwanted slipping of the wire. During the contact-free rotation, the speed of the roller is adjusted in such a way that a length of the wire corresponding to a prescribed length of the second section passes the roller contact-free. The length of the second section can be set independently of the roller employed and of the length of the first section. The length of the second section can advantageously be set without retooling the production line or the roller. A semi-finished product having the first section and having the second section is cut off of the shaped wire. The wire is cut after the lengthwise rolling.

In one embodiment, the continuous wire that was shaped in the first section is rolled lengthwise with an additional roller. The wire is further structured before being cut into the semi-finished products. Along its circumference, the additional roller has a first segment with a roller profile that rolls an additional profile into the wire, and also has a second segment without a roller profile that is rotated contact-free relative to the wire. During the rolling of the additional profile, the speed of the roller is adjusted in such a way that the speed of the roller profile is the same as the feeding speed of the wire in front of the additional roller. During the contact-free rotation, the speed of the roller is adjusted in such a way that the rolling of the additional profile is synchronized with the first sections. The method makes it possible to transport the wire continuously. The two or additional rollers can operate independently of and parallel to the wire. The segments without a roller profile are used to synchronize the rollers with the wire and with the structures that have already been embossed in them. In this manner, among other things, the speed changes of the wire due to the periodically occurring lengthening processes can be at least partially compensated for. The additional profile can serve to further structure the first sections or to emboss the profile into the second sections.

One embodiment provides that the wire is fed between the roller and the additional roller along a path. The length of the path is changed by a dancer roller synchronously to the rotation of the roller in such a way that the wire of the additional roller is fed at a constant speed. The lengthening of the wire by the front roller causes an increase in the speed of the wire. However, the speed is not constant—which could be compensated for by a rear, additional roller that rotates faster than the front roller—but rather, it varies. The speed depends on whether the front roller shapes the wire or allows it to pass without being shaped. It has been recognized that the speed change can be compensated for by a synchronous change in the path length, and this is practicable, particularly since the speed changes occur periodically. A "fast" portion of the wire that leaves the front roller at a higher speed is conveyed over a relatively longer path than a "slower" portion that leaves the front roller more slowly than the fast portion. The difference in the path length is tared in such a way that the two portions take the same amount of time to reach the rear, additional roller. In this manner, the wire is imparted with a constant mean speed in front of the rear roller. The change in the path length is essentially proportional to the momentary speed of the wire. The dancer roller can be actuated by a regulator that regulates the speed of the wire in front of the rear, additional roller as a control quantity and regulates it to a mean speed as the target quantity.

One embodiment provides for the following steps: rolling at least two lengthwise grooves into at least one of the sections and rolling a thread into the segments that are laterally delimited by the grooves, whereby the individual thread profiles are not as deep as the grooves. The circumference of the produced thread is divided into several segments by the grooves. Each segment of the thread is produced by an associated roller. The dimension of the roller profile is selected in such a way that it extends from one groove to the other groove along the circumference of the blank. The lateral edges of the roller profile engage into the grooves. Since the roller profile cannot displace any material due to the depth of the grooves, burrs caused by the edges of the rollers are avoided. The burrs could detrimentally affect the thread.

One embodiment provides that a neck and an expansion element are rolled into the first section, and a thread is rolled into the second section.

BRIEF DESCRIPTION OF THE DRAWINGS

The description below explains the invention on the basis of embodiments and figures given by way of examples. The figures show the following.

Unless otherwise indicated, identical or functionally equivalent elements are designated by the same reference numerals in the figures.

DETAILED DESCRIPTION

Figure 1:
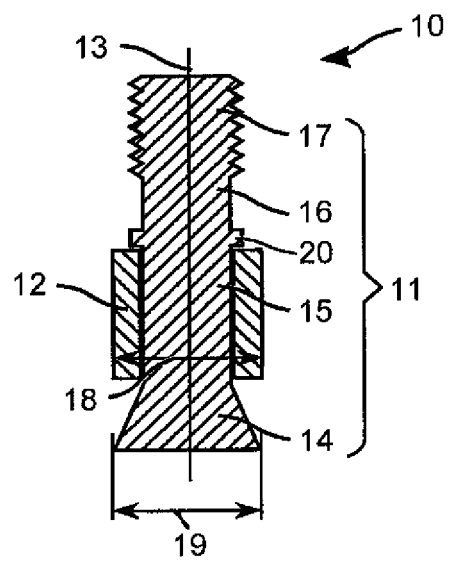
FIG. 1 an anchor,
FIG. 2 a production line for the anchor,
FIG. 3 an unrolled roller profile,
FIGS. 4 to 9 stages of an anchor bolt during the production process.

FIG. 1 shows an anchor 10 that, by way of example, is configured as an expansion anchor with an anchor bolt 11 and an expansion sleeve 12. Along the axis 13 of the anchor bolt 11, there is an expansion element 14, a neck 15, a shank 16, and a thread 17. The expansion sleeve 12, which can move along the anchor bolt 11, is pre-mounted on the neck 15. The outer diameter 18 of the expansion sleeve 12 is about the same size as the largest diameter 19 of the expansion element 14. The anchor 10 is driven into a drilled hole having a diameter corresponding to the outer diameter 18 of the expansion sleeve 12. A ring-shaped collar 20 between the neck 15 and the thread 17 can prevent the expansion sleeve 12 from sliding off of the anchor bolt 11. When the anchor 10 is tightened against the substrate, for example, by means of a nut 21, the expansion element 14 is pulled into the expansion sleeve 12 and the expansion sleeve 12 is firmly clamped onto a side wall of the drilled hole.

Figure 2:
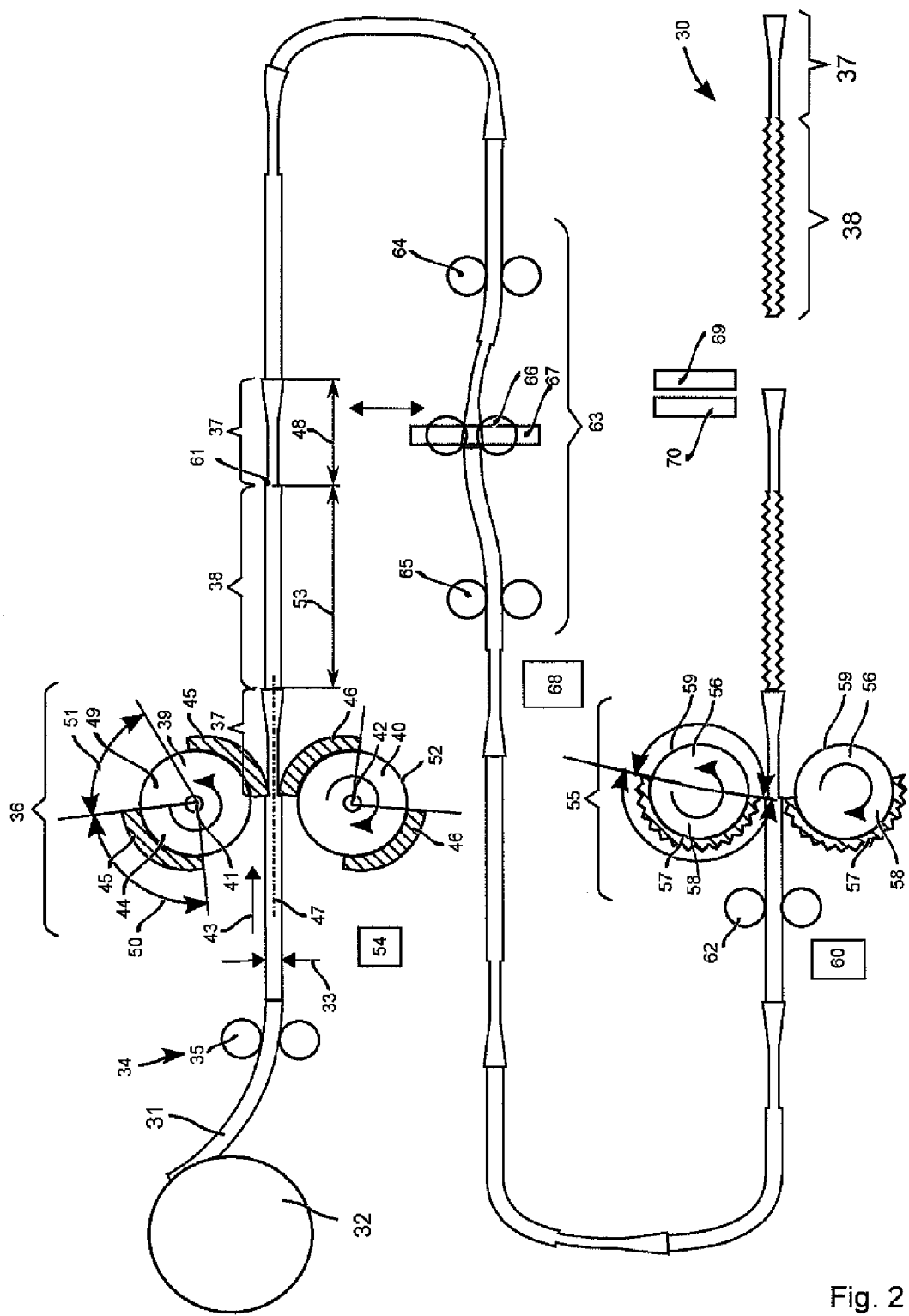
Figure 4:
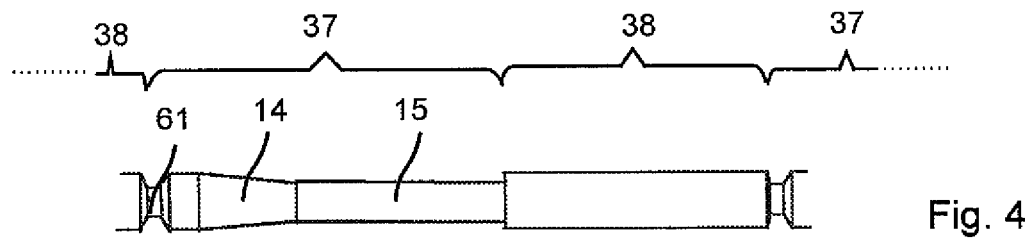

FIG. 2 shows a schematic depiction of a production line for a semi-finished product 30, especially the anchor bolt 11 for the anchor 10 described above. A wire 31 is shaped by several consecutive rollers before the wire 31 is cut into several semi-finished products 30.

The wire 31 can be supplied, for example, in wound-up form on a supply drum 32. The wire 31 has a length that is typically in the range of several hundred meters and can be referred to as being continuous, as compared to the semi-finished products 30 to be produced, whose length ranges from one to several decimeters. The solid cross section of the wire 31 is preferably circular, especially when the semi-finished product 30 is provided with a thread 17. The diameter 33 of the wire 31 is preferably constant and is coordinated with the radial dimensions of the semi-finished product 30 that is to be produced, for example, in the range from one-half to five centimeters. For example, the diameter 33 of the wire 31 can be the same as the flank diameter of the thread 17, i.e. approximately the mean value of the outer diameter and core diameter of the thread 17. As a result, the diameter 33 is typically many orders of magnitude smaller than the length of the wire 31, e.g. smaller than one-thousandth.

An unwinding device 34 takes up the wire 31 from the supply drum 32 at a preferably constant speed. The unwinding device 34 has, for instance, at least one pair of transport rollers 35 that are pressed onto the wire 31 on the opposite side. The transport rollers 35 rotate at a constant rotational speed.

The continuous wire 31 is fed to a first roller stand 36 that alternately shapes first sections 37 of the wire 31 and allows second sections 38 of the wire 31 to pass without being changed. The cross sectional surface area in the areas of the first sections 37 is reduced in comparison to the original cross sectional surface area which is still present, for example, in the second sections 38.

The first roller stand 36 can have an upper roller 39 and a lower roller 40 between which the wire 31 is fed. The two rollers 39, 40 are rotated at an adjustable speed around their upper axis 41 or lower axis 42 respectively. The axes 41, 42 are perpendicular to a direction of movement 43 of the wire 31. The direction of rotation of the upper roller 39 and of the lower roller 40 matches the direction of movement 43 of the wire 31, as a result of which the two rollers 39, 40 rotate in opposite directions. The direction of rotation of the rollers 39, 40 preferably remains unchanged.

A roller profile 45 is arranged in a segment 44 on the circumference of the upper roller 39. The lower roller 40 can be provided with a roller profile 46 that is mirror-symmetrical to the roller profile 45, and together, they define a cavity when they are unrolled. In at least one direction, the roller profiles 45, 46 limit the cavity to a dimension that is less than the diameter 33 of the wire 31. For example, the distance of the roller profiles 45, 46 in a plane perpendicular to the axes 41, 42 and through an axis 47 of the wire 31 is less than the diameter 33 of the wire 31. The wire 31 is pinched when it is in contact with the roller profiles 45, 46. Some of the material of the wire 31 is squeezed in the radial direction, and some is squeezed along the axis 47, resulting in a reduction of the cross sectional surface area and a lengthening of the wire 31.

Figure 3:
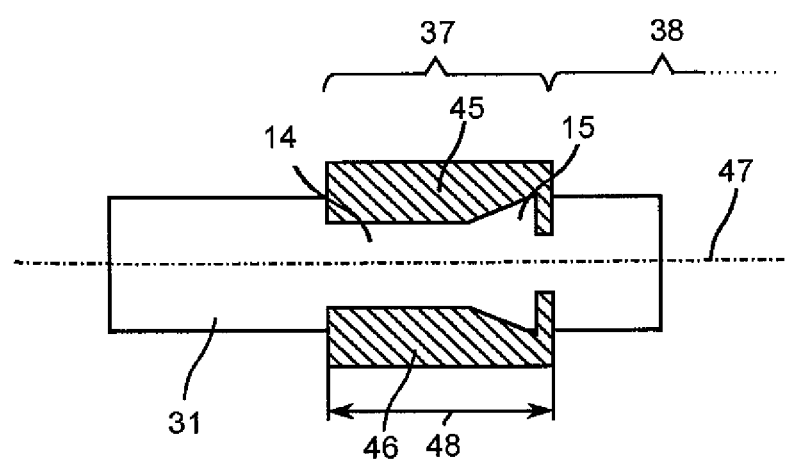

The roller profile 45 can be configured, for example, to shape the expansion element 14 and the neck 15. In a lengthwise section, FIG. 3 shows the roller profiles 45, 46 in an unrolled view. The shaped first section 37 of the wire 31 receives a shape that is similar to that of the roller profiles 45, 46 and that is elongated due to the lengthening of the wire 31. The length 48 of the first section 37 is prescribed by the length of the roller profiles 45, 46.

During the rolling procedure with the roller profiles 45, 46, the rollers 39, 40 are rotated at a first rotational speed. The first speed is adjusted in such a way that the surfaces of the roller profiles 45, 46 and the wire 31 move at virtually the same speed. The important aspect here is the speed of the wire 31 in front of the rollers 39, 40, which is referred to as the feeding sped. Due to the lengthening, the shaped wire 31 is accelerated to a higher speed when it exits from the rollers 39, 40. Since the fed wire 31 and the surface of the roller profiles 45, 46 move at about the same speed, it is prevented that the wire 31 accumulates in front of the rollers 39, 40 or that the wire 31 is pulled through the rollers 39, 40. The wire 31 is shaped by the radial action of the roller profiles 45, 46. A slight, negligible deviation in the feeding sped and in the speed of the rollers can be necessary if the wire 31 is fed through the rollers 39, 40 with some slippage.

The roller profile 45 takes up only part of the circumference of the upper roller 39. A blank segment 49 without a roller profile adjoins the segment 44 with the roller profile 45. The segment 44 with the roller profile 45 can take up a first angle 50 and the blank segment 49 can take up a second angle 51. The first angle 50 is defined essentially by the desired length 48 of the first section 37 and by the diameter of the upper roller 39. Since, as a rule, the rollers 39 are only available in certain diameters, the second angle 51 cannot be freely selected but rather it corresponds to the remaining portion of the circumference minus the first angle 50. Depending on the diameter of the upper roller 39, one or more pairs of the segment 44 with the roller profile 45 and of the blank segment 49 can be arranged along the circumference. The example shown has two segments 44 with the roller profiles 45 and two blank segments 49. The lower roller 40 likewise has a blank segment 52. The blank segment 49 remains at a distance from the wire 31 while the upper roller 40 is rotating, and it does not bring about any shaping. The wire 31 continues to be transported through the rollers 39, 40. This results in an unaffected second section 38 that adjoins the first, unshaped section 37 and that is not modified by the rollers 39, 40.

After the second section 38, the rollers 39, 40 emboss another first section 37 of the next anchor bolt 11 or another semi-finished product 30. In the above-mentioned example, the length 53 of the second section 38 is defined by the distance of consecutively rolled first sections 38. The desired length 53 of the second section 38 is achieved by changing the speed of the rollers 39, 40 to a value that differs from the first speed. If the first speed were retained, the length 53 of the second section 38 relative to the length 48 of the first section 37 would be prescribed by the ratio of the second angle 51 to the first angle 50. By lowering the speed to a second value, the length 53 of the second section 38 can be increased to a greater length than prescribed by the angle ratio. The set length 53 is inversely proportional to the speed of the rollers 39, 40.

If, for example, a greater length ratio of the second section 38 to the first section 37 than the appertaining angle ratio is to be achieved, then the speed of the rollers 39, 40 is reduced relative to the first speed as long as the non-shaping, blank segment 49, 52 is opposite from the wire. A sensor 54 detects when the start of the blank segment 49 is located opposite from the wire 31, that is to say, the wire 31 is no longer being touched by the roller profiles 45, 46. The speed of the rollers 39, 40 is now reduced to a second value, without having any effect on the wire 31. For example, the unwinding device 34 continues to move the wire 31 along the rollers 39, 40 at a known speed. The second speed is selected in such a way that the product of the speed of the wire 31 corresponds to the desired length 48 of the second section 38 during the period of time in which the wire is being moved past the blank segment 49. One end of the blank segment 49 is detected with the sensor 54 and the rollers 39, 40 are accelerated to the first speed before the roller profiles 45, 46 touch the wire 31 again.

The partially shaped wire 31 is continuously fed to a rear roller stand 55. The rear roller stand 55 can likewise have two rollers 56 with roller profiles 57. In addition to segments 58 with roller profiles 57, free or blank segments 59 are provided along the circumference of the roller 56. The roller profiles 57 can differ from the roller profiles 45, 46. In the example shown, the roller profiles 45, 46 roll the thread 17 into the second section 38 of the anchor bolt 11.

In an initial position, the blank segment 59 can be oriented opposite from the wire 31, as a result of which the wire 31 can pass without touching the roller 56. In front of the roller 56, a sensor device 60, for example, an image-acquisition device, can detect the shape of the wire 31. The sensor device 60 monitors whether the start of the second section 38 is passing the sensor device 60 and, if the result is positive, it emits a control signal. The start of the second section 38 is recognized, for example, by the expansion element 14 that marks the end of the first section 37. Advantageously, the first roller 39 can roll markings into the wire 31, for example, a notch or a shoulder 61, which are detected by the sensor device 60. In response to the control signal, the roller 56 is accelerated to the speed for the roller at which the surface speed of the roller profile 57 is equal to the speed of the wire 31 immediately in front of the rollers 56. The speed can be determined, for example, by idling rollers 62 that are in contact with the wire 31 in front of the roller 56. The beginning of the acceleration is coordinated with the initial position of the roller 56 and with the distance of the sensor device 60 from the roller 56, after which the start of the roller profile 57 touches the start of the second section 38. The rollers 56 are synchronized with the structures that are already present on the wire 31. After the rolling with the roller profile 57, the speed of the roller is changed in order to achieve a synchronization of the roller profile 57 with the next second section 38. The speed of the roller 56 is essentially adapted in such a way that precisely the first section 37 can pass unhindered. The speed is set as a function of the speed of the rollers, the length ratios of the two sections 37, 38, and the angle ratios of the two segments 59, 58.

The wire 31 is fed in front of the rear roller stand 55 along a path 63. The wire 31 is threaded through a stationary front roller pair 64 and through a stationary rear roller pair 65. Another roller pair that forms a dancer roller 66 is arranged between the two roller pairs 64, 65. The dancer roller 66 can be slid perpendicularly or obliquely to a connection line from the front roller pair 64 to the rear roller pair 65. The length of the path 63 from the front roller pair 64 to the rear roller pair 65 is changed by the dancer roller 66. The change in the path length is approximately proportional to the movement of the dancer roller 66 in the roller link 67. A speed sensor at idling rollers 62 determines the speed of the wire 31 at the rear roller pair 65. For example, one of the rollers is free-running and equipped with a speed monitor. A regulator 68 determines the difference between the detected speed of the wire 31 and a target value in the form of a mean speed. In response to the regulation, the dancer roller 66 is deflected further out if the speed is too high in order to increase the path length, or it is retracted if the speed is too low in order to reduce the path length. The mean speed is prescribed as the target value and it constitutes the time-averaged value of the speed of the wire 31 at the front roller pair 66. Variations in the speed of the wire 31 at the outlet of the front roller 39 are compensated for by the dancer roller 66, as a result of which a constant speed is achieved at the inlet of the rear roller 56.

A cutting device 69 is arranged at the end of the production line. The cutting device 69 continuously cuts the semi-finished products 30 from the shaped wire 31. Each of the semi-finished products 30 has a first section 37 and a second section 38. The production line has shaped at least one of the sections 37, 38 in terms of its length. The cutting device 69 can be controlled, for example, by means of a sensor device 70 that responds to the markings 61.

The production line, shown here by way of an example, has only two stands 36, 55 for structuring the two sections 37, 38. The number of stands and rollers depends on the complexity of the structures that are to be produced and on the degree of shaping required for the wire 31. Thus, several partial shaping steps and stands can be needed for shaping the first section 37. The production line can also process three or more sections with different stands. A stand can allow the first and second sections of the wire to pass with an unprofiled segment, and can process only a third section. The first and second sections are shaped independently by two other stands.

A single stand can have one, two or more rollers that process different segments of the wire.

By way of examples, FIGS. 4 to 9 show lengthwise sections through semi-finished products of an anchor bolt 11 that is produced with a roller line as described On first roller stands, rollers having profiles shape the neck 15, the expansion elements 14, and the notch 61 between the first sections 37 and the second sections 38. The other sections of the wire 31 pass the first roller stand without being changed due to the blank segments of the rollers.

Figure 5:
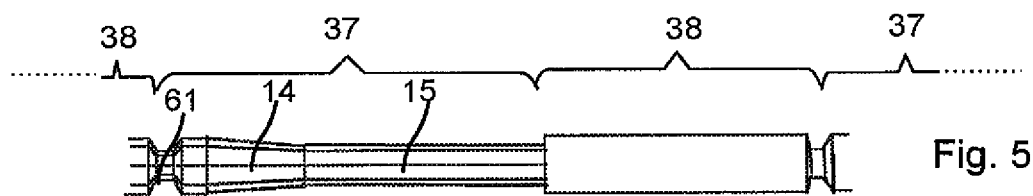

Optionally, another roller stand is provided that trims the cross section of the expansion element 14 to form an octagonal cross section, that is to say, to form a truncated pyramid with an octagonal base area (FIG. 5). The additional roller stand preferably has two roller pairs that only roll the truncated pyramid. The other sections of the anchor bolt 11 pass the rollers without being changed.

Figure 6:
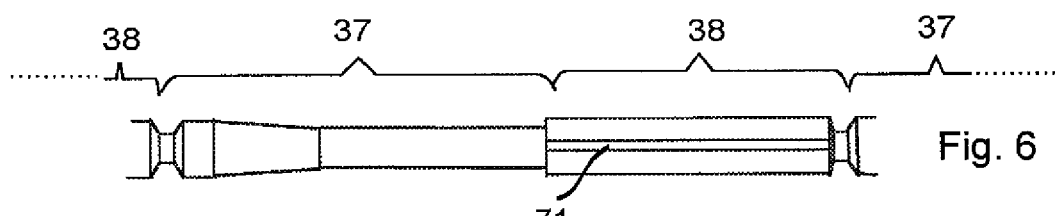
Figure 7:
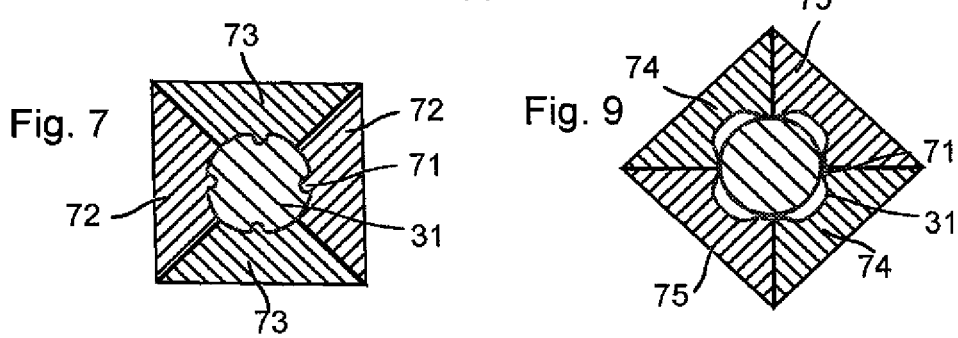
Figure 9:
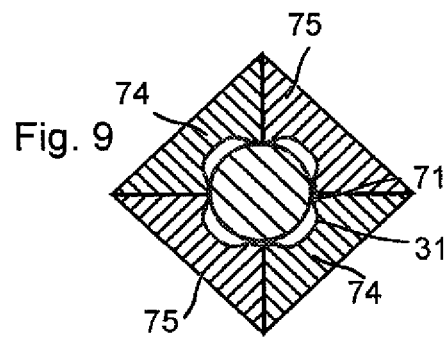
Figure 8:
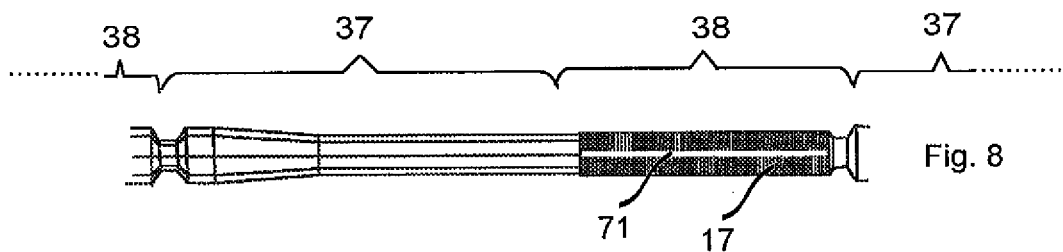

The thread 17 can be rolled into the second section 38. First of all, four lengthwise grooves 71 are rolled into the second section 38 (FIG. 6). In an enlarged view, FIG. 7 shows a cross section through the second section 38. The grooves 71 are preferably arranged offset relative to each other by the same angle, e.g. 90°. A first roller pair 72 can roll two of the opposite grooves 71 and a second roller pair 73, arranged so as to be rotated by 90° relative to the first roller pair, can roll the two other grooves 71. The two roller pairs 72, 73 can be arranged offset along the direction of movement of the wire 31. A third roller pair 74 and a fourth roller pair 75 have roller profiles for rolling the individual thread profiles of the thread 17 (FIGS. 8, 9). The third roller pair 74 is arranged so as to be rotated by 45° relative to the first and second roller pairs 72, 73. The threads are created in the segments 76 between the grooves 71. The lateral edges 77 of the roller profiles running in the circumferential direction engage into the grooves 71. The grooves 71 are so deep that the lateral edges 77 do not shape the wire 31. The threads run continuously between adjacent grooves 71.

Subsequently, the cutting device 69 cuts the anchor bolt 11 off of the wire 31.

What is claimed is:

1. A production method for an elongated semi-finished product having at least two differently profiled first and second sections of prescribed lengths, comprising the following steps:
   rolling a continuously fed wire lengthwise using a rotating roller, the rotating roller, along its circumference, having a first segment with a roller profile rolling a profile into the first section of the wire, and having a second segment without a roller profile rotated contact-free relative to the wire,
   adjusting a speed of the roller, during the rolling of the profile, in such a way that the speed of the roller profile is the same as the feeding speed of the wire,
   adjusting the speed of the roller, during the contact-free rotation, in such a way that a length of the wire corresponding to the prescribed length of the second section passes the roller contact-free, and
   cutting a semi-finished product, having the first section and having the second section, off of the shaped wire.

2. The production method as recited in claim 1 wherein the continuous wire shaped by the roller profile is rolled lengthwise with an additional roller that, along its circumference, has an additional first segment with an additional roller profile that rolls an additional profile into the wire, and also has an additional second segment without a roller profile that is rotated contact-free relative to the wire, whereby, during the rolling of the additional profile, the speed of the additional roller is adjusted in such a way that the speed of the additional roller profile is the same as the feeding speed of the wire, and during the contact-free rotation, the speed of the additional roller is adjusted in such a way that the rolling of the additional profile is synchronized with the first sections.

3. The production method as recited in claim 2 wherein the additional profile is rolled alternately into the first sections or into the second sections.

4. The production method as recited in claim 3 wherein a neck and an expansion element are rolled into the first section, and a thread is rolled into the second section.

5. The production method as recited in claim 3 further comprising:
   rolling at least two lengthwise grooves into at least one of the first and second sections, and
   rolling a thread into wire segments that are laterally delimited by the grooves, whereby the individual thread profiles are not as deep as the grooves.

6. The production method as recited in claim 2 wherein a neck and an expansion element are rolled into the first section, and a thread is rolled into the second section.

7. The production method as recited in claim 2 wherein a neck and an expansion element are rolled into the first section, and a thread is rolled into the second section.

8. The production method as recited in claim 2 further comprising:
   rolling at least two lengthwise grooves into at least one of the first and second sections, and
   rolling a thread into wire segments that are laterally delimited by the grooves, whereby the individual thread profiles are not as deep as the grooves.

9. The production method as recited in claim 2 wherein the wire is fed between the roller and the additional roller along a path whose length is changed by a dancer roller synchronously to the rotation of the roller in such a way that the wire is fed to the additional roller at a constant speed.

10. The production method as recited in claim 9 wherein a neck and an expansion element are rolled into the first section, and a thread is rolled into the second section.

11. The production method as recited in claim 9 further comprising:
   rolling at least two lengthwise grooves into at least one of the first and second sections, and
   rolling a thread into wire segments that are laterally delimited by the grooves, whereby the individual thread profiles are not as deep as the grooves.

12. The production method as recited in claim 9 wherein the additional profile is rolled alternately into the first sections or into the second sections.

13. The production method as recited in claim 1 wherein a neck and an expansion element are rolled into the first section, and a thread is rolled into the second section.

14. The production method as recited in claim 13 further comprising:
   rolling at least two lengthwise grooves into at least one of the first and second sections, and
   rolling a thread into wire segments that are laterally delimited by the grooves, whereby the individual thread profiles are not as deep as the grooves.

15. The production method as recited in claim 1 further comprising:
   rolling at least two lengthwise grooves into at least one of the first and second section, and
   rolling a thread into wire segments that are laterally delimited by the grooves, whereby the individual thread profiles are not as deep as the grooves.

16. The production method as recited in claim 15 wherein a neck and an expansion element are rolled into the first section, and a thread is rolled into the second section.

17. A production method for an elongated semi-finished product having at least two differently profiled first section of prescribed length and second section of changeable length, comprising the following steps:
   rolling a continuously fed wire lengthwise using a rotating roller, the rotating roller, along its circumference, having a first segment with a roller profile rolling a profile into the first section of the wire, and having a second segment without a roller profile rotated contact-free relative to the wire,
   adjusting a speed of the roller, during the rolling of the profile, in such a way that the speed of the roller profile is the same as the feeding speed of the wire,
   adjusting the speed of the roller, during the contact-free rotation, in such a way that a length of the wire corresponding to the prescribed length of the second section passes the roller contact-free, and
   cutting a semi-finished product, having the first section and having the second, section off of the shaped wire;
   wherein the length of the second section can be set without retooling.

18. The production method as recited in claim 17 wherein the continuous wire shaped by the roller profile is rolled lengthwise with an additional roller that, along its circumference, has an additional first segment with an additional roller profile that rolls an additional profile into the wire, and also has an additional second segment without a roller profile that is rotated contact-free relative to the wire, whereby, during the rolling of the additional profile, the speed of the additional roller is adjusted in such a way that the speed of the additional roller profile is the same as the feeding speed of the wire, and during the contact-free rotation, the speed of the additional roller is adjusted in such a way that the rolling of the additional profile is synchronized with the first sections.

19. The production method as recited in claim 18 wherein the wire is fed between the roller and the additional roller along a path whose length is changed by a dancer roller synchronously to the rotation of the roller in such a way that the wire is fed to the additional roller at a constant speed.

20. The production method as recited in claim 19 wherein the additional profile is rolled alternately into the first sections or into the second sections.

* * * * *